United States Patent [19]

Fallon et al.

[11] Patent Number: 4,629,965
[45] Date of Patent: Dec. 16, 1986

[54] BATTERY CHARGER TERMINATION CIRCUIT

[75] Inventors: William H. Fallon, Cleveland; William R. Schober, Avon Lake, both of Ohio

[73] Assignee: General Battery Corporation, Reading, Pa.

[21] Appl. No.: 705,685

[22] Filed: Feb. 26, 1985

[51] Int. Cl.⁴ ............................................. H02J 7/04
[52] U.S. Cl. .................................... 320/39; 320/20; 320/23; 320/32; 320/37
[58] Field of Search ................. 320/23, 24, 37, 39, 320/20, 32

[56] References Cited

U.S. PATENT DOCUMENTS

| | | | |
|---|---|---|---|
| 3,700,997 | 10/1972 | Smith | 320/20 |
| 3,736,490 | 5/1973 | Fallon et al. | 320/39 |
| 3,848,173 | 11/1974 | Hase | 320/23 |
| 3,864,617 | 2/1975 | Smith et al. | 320/23 |
| 3,946,299 | 3/1976 | Christianson et al. | 320/43 |
| 3,992,658 | 11/1976 | Bechtold et al. | 320/20 |
| 4,045,717 | 8/1977 | Fallon et al. | 320/2 |
| 4,091,320 | 5/1978 | Foster | 320/40 |
| 4,118,661 | 10/1978 | Siekierski et al. | 320/40 |
| 4,198,593 | 4/1980 | Ballman | 320/31 |
| 4,225,815 | 9/1980 | Lind et al. | 320/20 X |
| 4,227,141 | 10/1980 | Cross | 320/20 |
| 4,270,080 | 5/1981 | Kostecki | 320/24 |
| 4,313,078 | 1/1982 | Bilsky et al. | 320/15 |
| 4,354,148 | 10/1982 | Tada et al. | 320/20 |
| 4,371,826 | 2/1983 | Shelly | 320/21 |
| 4,382,221 | 5/1983 | Reynolds | 320/35 |
| 4,383,210 | 5/1983 | Wilkinson | 320/2 |
| 4,394,611 | 7/1983 | Fallon et al. | 320/21 |
| 4,396,880 | 8/1983 | Windebank | 320/21 |
| 4,418,310 | 11/1983 | Bollinger | 320/39 |

Primary Examiner—Peter S. Wong
Assistant Examiner—Mark D. Simpson
Attorney, Agent, or Firm—Benasutti and Murray

[57] ABSTRACT

A system for charging a storage battery initially charges the battery at a maximum rate of current which tapers in magnitude until the battery attains a selected voltage, and thereafter charges the battery with a continuing reduction of current until termination. Termination is accomplished by sensing current delivered to the battery over time, monitoring a curve representative of such data, and discontinuing charger operation when the slope of the curve attains a selected value.

17 Claims, 7 Drawing Figures

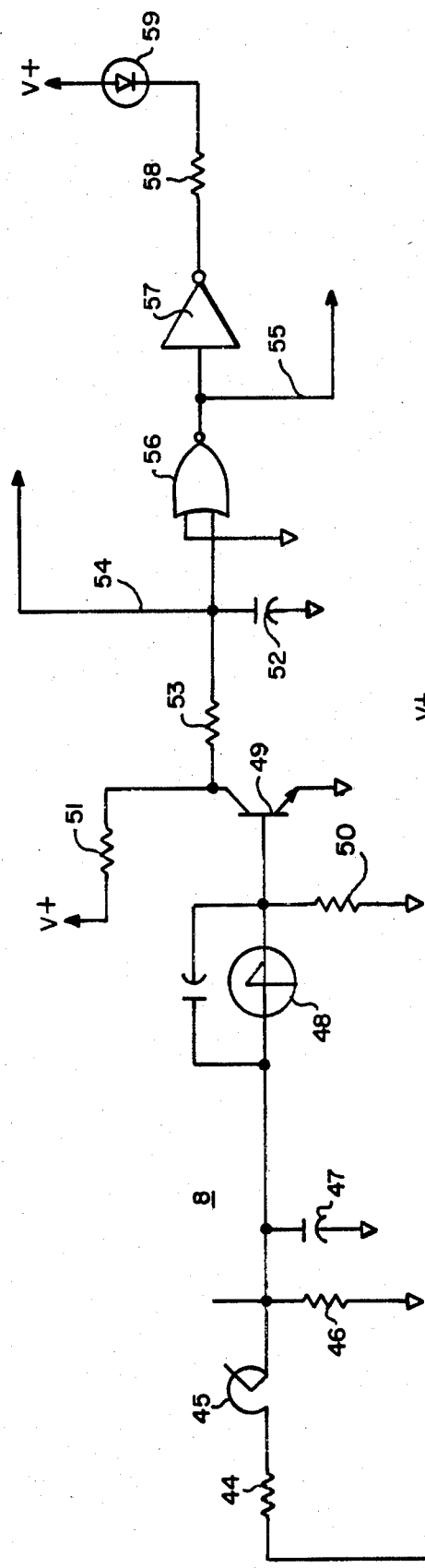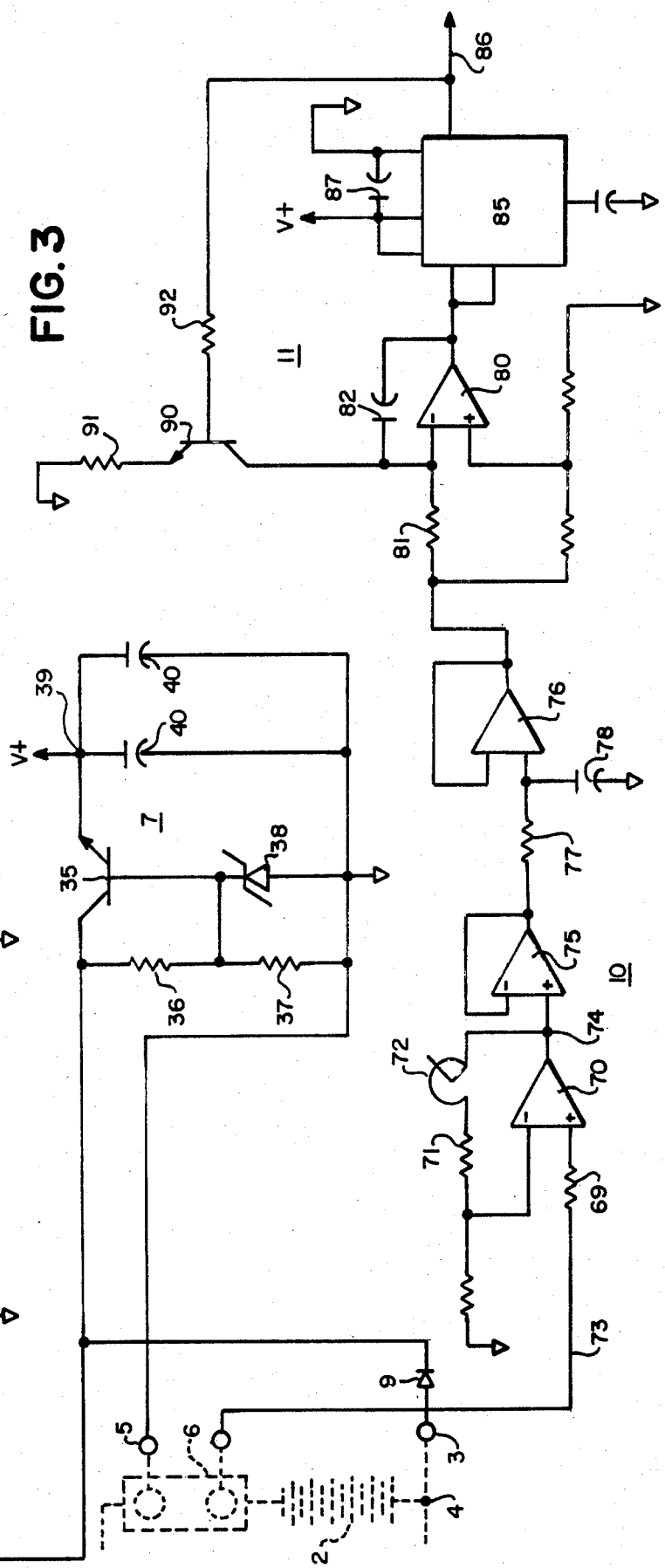
FIG.3

BATTERY CHARGER TERMINATION CIRCUIT

BACKGROUND OF THE INVENTION

The present invention relates generally to a system for charging electric storage batteries, and in particular, to a system for automatically charging such storage batteries both safely and efficiently.

In charging electric storage batteries primarily intended for use in connection with heavy duty/traction machinery applications, such as fork-lifts, transportation devices, mining equipment, etc., a variety of important considerations must be balanced. For example, since such machinery will generally be rendered inoperative during battery charging, it is extremely important that charge times be minimized to the extent possible. This is to be balanced with the need to assure that the storage battery under charge is not damaged during charging, representing a significant cost in replacement, as well as certain environmental considerations such as gassing (the discharge of hydrogen and oxygen resulting from encountered electrolysis), which is commonly encountered in connection with the charging of such storage batteries.

Particular attention must be paid to such factors during finishing portions of the battery charging process, when battery charging rates must generally be slowed to prevent overcharging of the battery, and the potential for damage which such overcharging can cause. Accordingly, a properly designed battery charger must be capable of charging a storage battery in a minimum amount of time, while correcting for and minimizing gassing to the extent possible, as well as protecting against damage to the storage battery during the charging process.

A variety of battery charging devices have been developed in an effort to accommodate these various considerations. Typically, such battery charging devices will apply a full or maximum charging rate to the battery during an initial portion of the battery charging cycle, and thereafter apply a finishing charge, at a reduced rate, to completely restore the battery to its fully charged state. A variety of devices have been developed in an effort to regulate the charging cycle, particularly its finishing portions, in an effort to both minimize gassing and assure correct charge termination without unduly extending the period of time required to fully charge the storage battery. Examples of battery charging equipment of this type may be had with reference to U.S. Pats. No. 4,396,880; 4,394,611; 4,382,221; 4,371,826; 4,313,078; 4,091,320; 4,045,717; 3,946,299; and 3,736,490.

In each case, the battery charging equipment described generally conducts the finishing portions of battery charging in accordance with voltages and/or currents sensed at the battery's terminals. Although generally providing adequate results, it was found that such systems were not entirely effective in accommodating voltage/current transients which may occur during charging, but which may not be sensed by the battery charger. It therefore remained to develop a system which further increases battery charging efficiency by correctly monitoring rates of change in such parameters during battery charging.

SUMMARY OF THE INVENTION

It is therefore a primary object of the present invention to provide a battery charger of improved construction.

It is also an object of the present invention to provide a battery charger which is cabable of minimizing the amount of time required to charge a storage battery.

It is also an object of the present invention to provide a battery charger which is capable of optimizing the time required to charge a storage battery, while minimizing gassing and the potential for damage to the storage battery resulting from overcharging.

It is also an object of the present invention to provide a system which is capable of automatically accomplishing the foregoing tasks.

It is also an object of the present invention to provide a system which is capable of more accurately accomplishing the foregoing tasks by monitoring timed rates of change in sensed battery parameters monitored in connection with the charging process.

These and other objects which will become apparent are achieved in accordance with the present invention by providing a battery charging termination system which initially allows the battery to charge at a maximum rate which tapers in magnitude until a specified capacity is reached, and which thereafter monitors the current slope versus time as the charge continues to taper during the finishing portion of the charge cycle.

In operation, the battery charging system of the present invention monitors current delivered to the battery by means of a shunt placed in series with the storage battery being charged. After determining that the initial portion of the charging process has been completed, and that finishing portions of the charging process are to commence, currents sensed by means of the shunt are converted to digital signals using a voltage controlled oscillator. The digital signals are then stored and compared with subsequently produced signals until such time as the compared signals differ by no more than a specified amount (i.e., slope). If this condition continues for a specified number of repetitions, the battery charging process is deemed to have been completed and the charger's operation is automatically terminated.

For further detail regarding the battery charging termination system of the present invention, reference is made to the following detailed description of a preferred embodiment battery charger produced in accordance with the present invention, taken in conjunction with the following illustrations.

BRIEF DESCRIPTION OF THE DRAWINGS

FIG. 3 is a schematic diagram illustrating portions of circuitry embodying the battery charging system of the present invention which are used to determine transition between initial and finishing portions of the charging process, and to monitor the current supplied to the storage battery under charge.

In the several views provided, like reference numerals denote similar structure.

DETAILED DESCRIPTION OF THE PREFERRED EMBODIMENT

Figure 1:
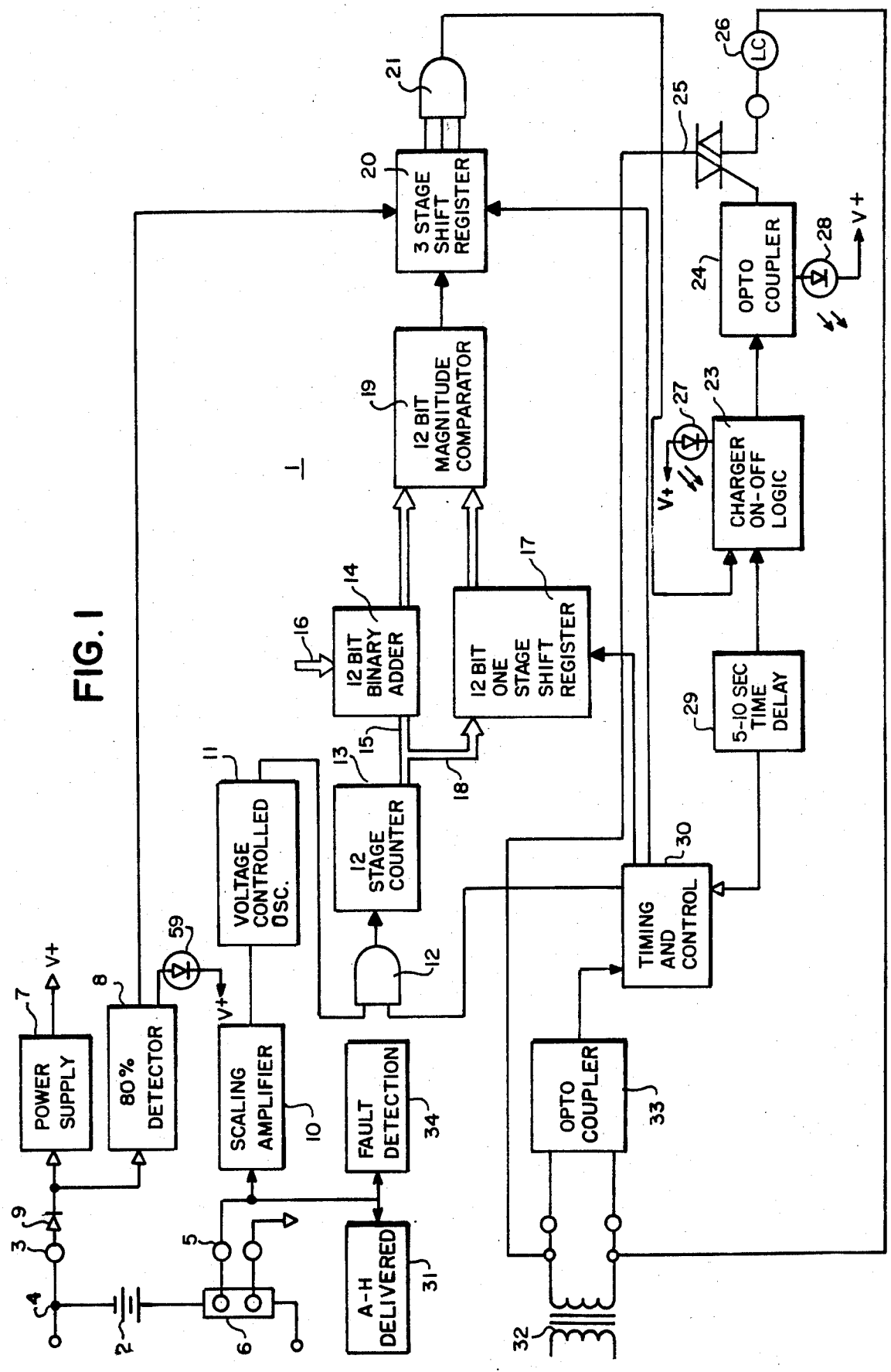
FIG. 1 is a block diagram of a battery charging termination system produced in accordance with the present invention.

Although specific forms of the invention have been selected for illustration in the drawings, and the following description is drawn in specific terms for the purpose of describing these forms of the invention, this description is not intended to limit the scope of the invention which is defined in the appended claims.

FIG. 1 is a block diagram providing an overview of a preferred embodiment battery charging termination system produced in accordance with the present invention. A battery charger termination circuit 1 is electrically associated with a storage battery 2 under charge by means of two connections. A first connection 3 is derived from the negative terminal 4 of the battery 2 and provides a means for sensing the voltage developed across the battery's terminals during the charging process. A second connection 5 is electrically associated with a shunt 6 placed in series with the battery 2 under charge and provides a means for monitoring the current supplied to the battery 2 during the charging process.

Figure 2:
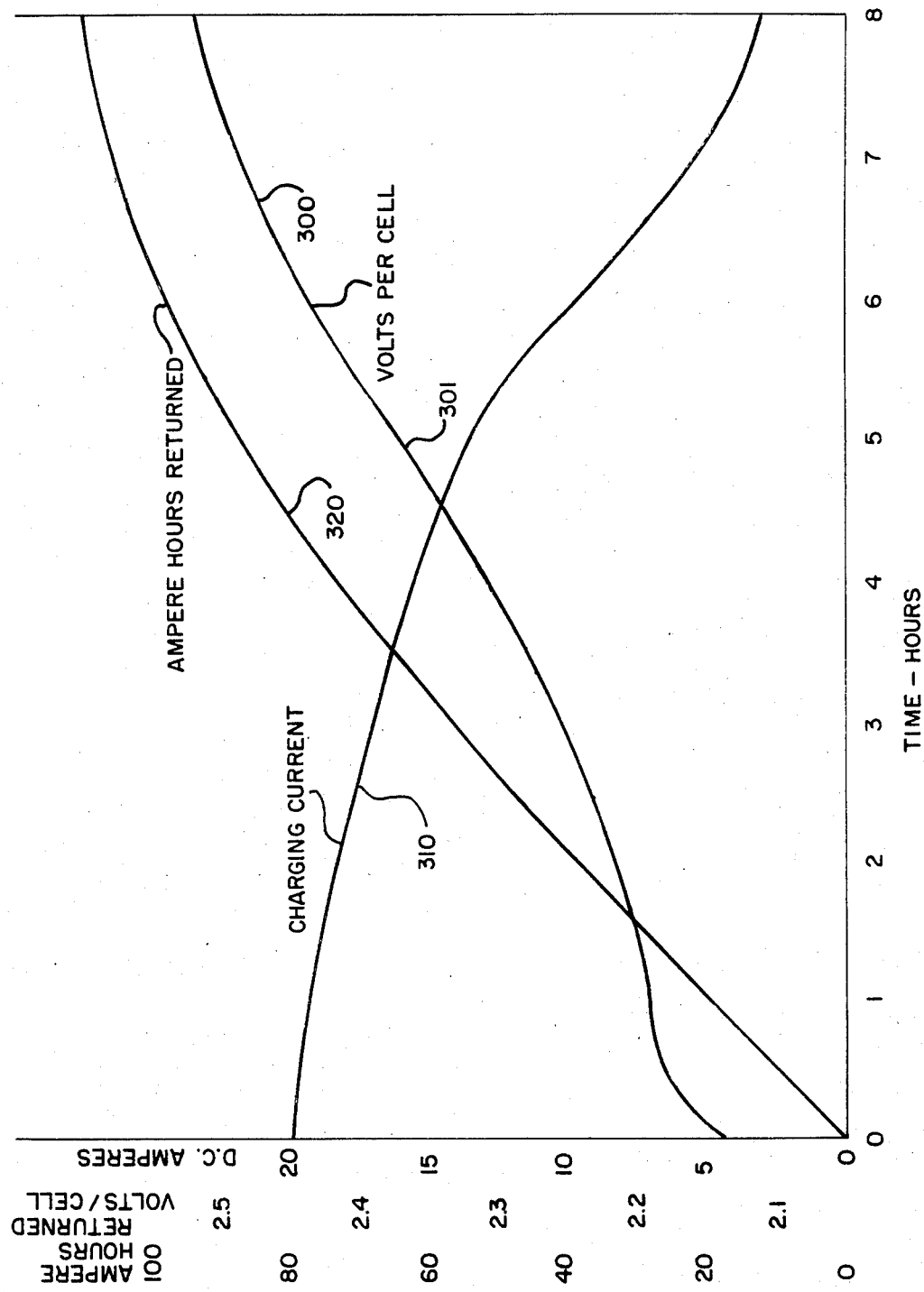
FIG. 2 is a graphical representation of variations in voltage and charging current over time.

FIG. 2 provides a graphical representation of typical charging characteristics which can be expected per 100 ampere hours of battery charging making use of a series "TF" Battery Charger of the type manufactured by the Hertner Division of General Battery Corporation, for example. Curve 300 is representative of typical variations in voltage per cell over time, as would be sensed at connection 3 in FIG. 1. Curve 310 is representative of typical variations in charging current over time, as would be sensed at terminal 5 in FIG. 1.

Associated with the connection 3 are a power supply 7 and a voltage level detection circuit 8, each of which are coupled to the connection 3 by means of a diode 9. The power supply 7 contains circuitry for providing operational voltages necessary for use in connection with the remainder of the circuit 1. The voltage level detection circuit 8 contains circuitry for sensing when the voltage developed at the terminal 4 (See curve 300 in FIG. 2, at 301) reaches a preselected percentage of the voltage which will normally be developed across a fully charged storage battery, indicating transition between initial portions of the battery charging process and finishing portions of the battery charging process. As will be more fully described below, both the power supply 7 and the voltage level detection circuit 8 are electrically coupled to the remainder of the battery charger termination circuit 1 in a manner which will initiate operation of the battery charger termination circuit 1 only after the preselected voltage level has been reached. Prior to that time, the battery charger termination circuit 1 will be disabled, preventing its operation and thereby enabling maximum charging of the storage battery 2 during the initial portions of the battery charging process.

Upon initiating operating of the battery charger termination circuit 1, current delivered to the battery 2 in accordance with the curve 310 shown in FIG. 2 is monitored by means of the shunt 6. To this end, a scaling amplifier 10 is electrically associated with the connection 5, the scaling amplifier 10 in turn being coupled to a voltage controlled oscillator 11. The scaling amplifier 10 and the voltage controlled oscillator 11 cooperate to convert the level developed at the connection 5 by means of the shunt 6, representative of current delivered to the battery 2 under charge, to a digital signal which is in turn applied to a first input of AND circuit 12. When enabled, the signal applied to the first input of AND circuit 12 is coupled through to a twelve stage counter 13 for subsequent processing. The output of the counter 13 is separately routed to a twelve bit binary adder 14 by means of data buss 15, and to a twelve bit one stage shift register 17 by means of the data buss 18.

As previously indicated, and in accordance with the present invention, finishing portions of the battery charging process are monitored in accordance with variations in slope of the current curve 310. Adequate results in this regard are achieved in connection with the detection of slopes lying in a range of between −2.0 and −0.5 amperes per 100 ampere hours per hour, with slopes between −1.5 and −1.0 amperes per 100 ampere hours per hour being preferred. To develop the slope value desired, the adder 14 modifies the signal received from the counter 13 with an offset representative of the desired rate of change in current supplied to the battery which is to indicate completion of the finishing portions of the charging process. This offset is introduced into the adder 14 by means of the data buss 16. The shift register 17 provides a means for storing a signal representative of an immediately preceding sensed current level supplied to the battery 2, for comparison with modified, presently sensed data stored in the adder 14 by means of a twelve bit magnitude comparator 19.

Successful comparisons of stored data will thus represent a rate of change in charging current (or slope) which has fallen below a specified minimum, indicating successful completion of the battery charging process as will be more fully described below. To prevent spurious successful comparisons from erroneously signaling an end of the battery charging process, the output of the compartor 19 is introduced into a three stage shift register 20 operatively associated with a three input AND circuit 21. The shift register 20 and AND circuit 21 cooperate to assure that three successive successful comparisons are made by the comparator 19 before the battery charger is shut down, assuring that the finishing portions of the battery charging process are indeed at an end. Upon sensing the successful completion of the finishing portions of the battery charging process, a transition is produced at the output of AND circuit 21, signaling the termination of battery charging.

To accomplish this, the output of AND circuit 21 is coupled to the input of a charger on-off logic circuit 23 which, in cooperation with an optocoupler 24 in operational association with a triac 25, deenergizes line contactor 26 which shuts down the charger. To provide a visual indication of charger operation and condition, indicator lights 27, 28 are respectively associated with the charger on-off logic circuit 23 and the optocoupler 24. The indicator light 27 is used to indicate that the charge is completed, while the indicator light 28 is used to indicate when the battery charger is in operation.

To properly regulate operation of the various components previously described, a number of timing and control signals are provided. For example, a time delay circuit 29 is provided which is coupled to the charger on-off logic circuit 23, and which is capable of disabling the charger on-off logic circuit 23 for a a specified period of time after the battery charger has been switched on, to allow for transients which may occur during charger start-up. The time delay circuit 29 is also coupled to a timing and control circuit 30 which, after initial start-up as determined by the time delay circuit 29, enables the timing and control circuit 30 to develop a plurality of timing signals as will be more fully described below. The basis for such timing signals is a 60 Hz source taken from the transformer 32 of the battery charger, preferably by means of an optocoupler 33 in association with the transformer 32.

Lastly, in connection with many charging applications it becomes desirable to monitor the ampere hours which are returned to the battery during charging (See Curve 320 in FIG. 2), or to provide fault detection (e.g., reversed polarity or shorted cells) circuitry for use in further monitoring the battery under charge. If desired, either function is readily provided in connection with the battery charger termination circuit 1 of the present invention as indicated at 31 and 34 in FIG. 1, respectively.

FIG. 3 is a circuit diagram describing the power supply 7 and voltaqge level detection circuit 8 in further detail. As previously indicated, both the power supply 7 and the voltage level detection circuit 8 are coupled to the terminal 4 of the battery 2 by means of a diode 9, which diode protects the power supply circuitry against connection of a battery with reversed polarity, and first connection 3.

Regarding operation of the power supply 7, the voltage appearing at terminal 4 is coupled to the collector of a transistor 35 via connection 3. Transistor 35, in combination with a biasing network comprising resistors 36, 37, and Zener diode 38, develops a regulated supply voltage at terminal 39. Capacitors 40 are provided for filtering purposes as is conventional.

The voltage appearing at terminal 4 is also coupled, via first connection 3 and diode 9, to a voltage dividing network comprising fixed resistors 44, 46 and variable resistor 45, the node connecting resistors 45, 46 further being associated with a capacitor 47 coupled to ground and a unilateral switch 48. The unilateral switch 48 acts in combination with transistor 49 to provide a switching function which is essentially responsive to voltage. Below a specified voltage, stored by means of capacitor 47, the unilateral switch 48 and the biasing network comprising resistors 50, 51 will combine to switch transistor 49 off. This will in turn charge capacitor 52 through resistors 51, 53, causing the voltage developed at the data line 54 to go high during initial portions of the charging process (when the high sensed at the terminal 4 is less than the desired threshold). Correct setting of the variable resistor 45 will cause breakdown of the unilateral switch 48 when the battery's terminal voltage reaches a level selected to cause transition of the battery charging process from its initial to its finishing stage. This will in turn cause the transistor 49 to be switched on, in turn discharging the capacitor 52 through resistor 53, and causing the voltage developed at the data line 54 to go low during finishing portions of the charging process. In connection with most electric storage battery applications, the threshold used to cause transition between initial and finishing portions of the charging cycle will be when battery has been recharged to 80% of its ampere-hour capacity. This generally occurs when the battery terminal voltage is on the order of 2.37 volts per cell (301 in FIG. 2).

The signal developed at data line 54 is applied to a first input of NOR circuit 56, the other input of which is coupled to ground. Accordingly, the signal developed at the output of NOR circuit 56 (data line 55) will be the converse of the signal developed at data line 54, going from low to high when the threshold voltage is sensed. The output of NOR circuit 56 is in turn coupled to an inverter 57 which, in cooperation with resistor 58, serves to activate the light emitting diode 59 in response to changes in state at the output of NOR circuit 56. In the configuration shown, the light emitting diode 59 will be activated when the output of inverter 57 goes low, which corresponds to a sensed terminal voltage equal to or exceeding the threshold level selected by means of the resistor 45, and accordingly indicates entry of the battery charging circuit 1 into finishing portions of the battery charging process.

FIG. 3 also illustrates circuitry which is used to convert current sensed by means of the shunt 6 to a digital signal for subsequent processing. In its preferred embodiment, and to provide a correct range of operational parameters, the shunt 6 should be capable of providing on the order of 100 millivolts across its terminals during initial stages of battery charging, and no less than approximately 10 millivolts at the end of the battery charging process. These voltages are in turn applied to the scaling amplifier 10, via resistor 69, entering the non-inverting input of an operational amplifier 70. The gain of operational amplifier 70 is primarily determined by a ratio of resistances developed across resistors 71, 72 and the resistor 69. Ultimately, adjustment of the variable resistor 72 will determine the gain of the operational amplifier 70. The output of the operational amplifier 70 is in turn applied to a series combination of buffers 75, 76, separated by a filtering network comprising resistor 77 and capacitor 78.

The scaled and buffered output of the scaling amplifier 10 is in turn applied to the input of the voltage controlled oscillator 11, entering an operational amplifier 80 which, by virtue of resistor 81 and capacitor 82, acts an integrator. The integrated output of amplifier 80 is in turn applied to the input of a voltage controlled oscillator circuit 85 (e.g., Signetics 555), in turn developing a series of pulses at the output 86 of the voltage controlled oscillator circuit 85 having a frequency which varies in accordance with the voltage developed at the output of the scaling amplifier 10. Completing the voltage controlled oscillator 11 is transistor 90 which, in combination with biasing resistors 91, 92, serves to periodically discharge capacitor 82 to achieve a correct output from the voltage controlled oscillator 11, at 86.

Making use of a shunt 6 as previously described, the output of the scaling amplifier 10 should preferably be adjusted (using resistor 72) so that the voltage developed at its output fluctuates between approximately 0 and 8.5 volts. The voltage controlled oscillator 11 is preferably adjusted (by varying capacitors 87, 82) so that such a voltage swing will cause a frequency of up to 115 Hz to be developed at the output 86 of the voltage controlled oscillator 11.

Figure 4:
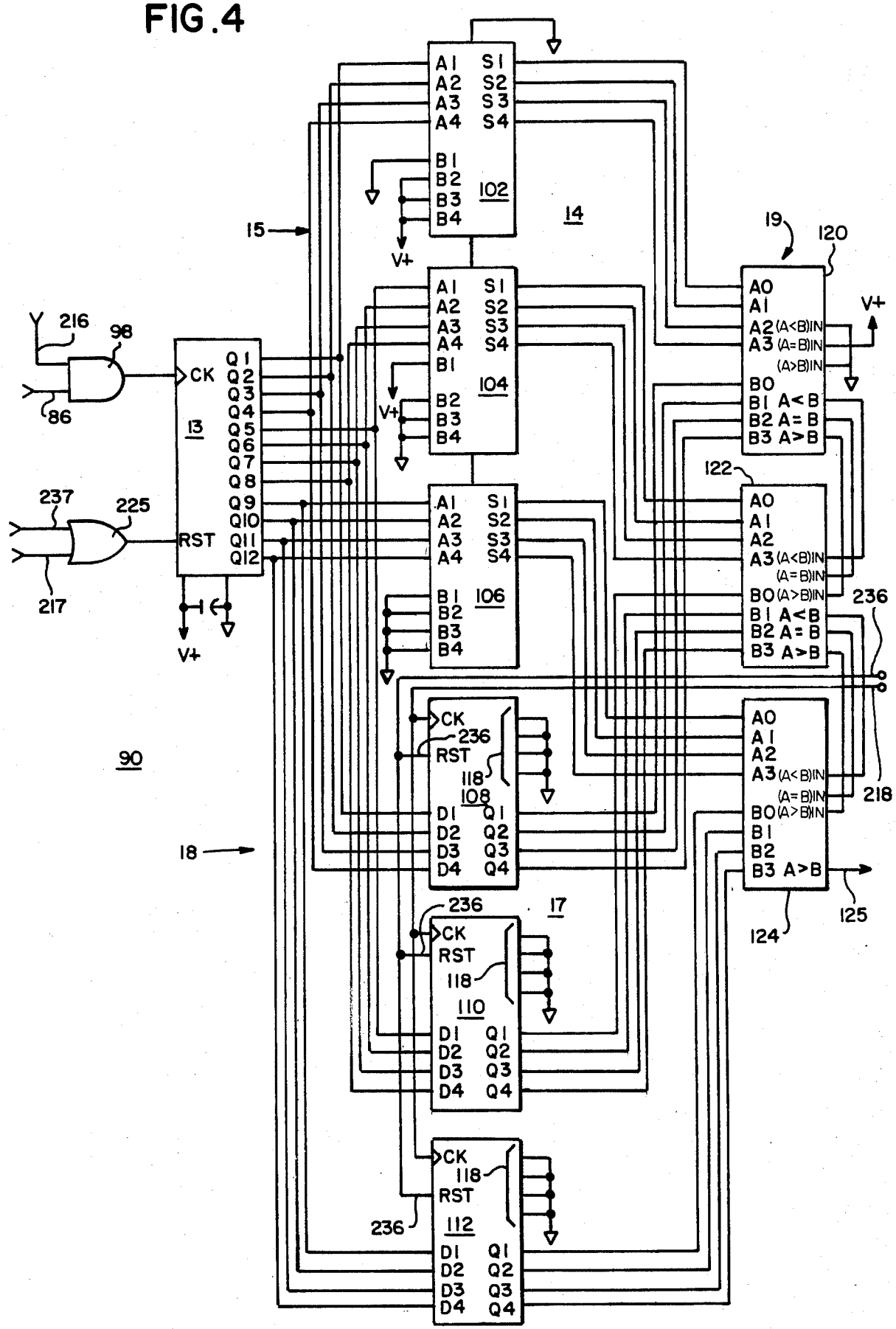
FIG. 4 is a schematic diagram of circuitry used to store and compare the monitored charging currents produced by the circuitry illustrated in FIG. 3.

The output 86 of the voltage controlled oscillator 11 is in turn introduced to a data processing circuit 90 as illustrated in FIG. 4, entering a first input of AND circuit 98. The output of AND circuit 98 serves as a clock (CK) input to the twelve stage counter 13. As previously described, data provided at outputs Q1 . . .

Q12 of the counter 13 is simultaneously introduced into the twelve bit binary adder 14 by means of data buss 15, as well as the twelve bit one stage shift register 17 by means of data buss 18.

As illustrated in FIG. 4, the adder 14 comprises three four bit adder circuits 102, 104, 106 (e.g., RCA 4008) which combine to receive the twelve bits Q1 . . . Q12 of data developed at the output of the counter 13. The shift register 17 comprises three four bit shift register circuits 108, 110, 112 (e.g., Motorola 4076) which also combine to receive the twelve bits Q1 . . . Q12 of data developed at the output of the counter 13.

As previously indicated, slope of the current curve 310 (FIG. 2) is monitored by means of an offset introduced into the adder 14. This offset, generally represented in FIG. 1 as the data buss 16 is introduced into the adder circuits 102, 104, 106 by means of the inputs B1 . . . B4 associated with each adder circuit by coupling each such input either to the circuit's supply voltage, or to ground, as needed, to develop a digital representation of a desired offset. The adder circuits 102, 104, 106 will accordingly develop respective series of outputs S1 . . . S4 which are representative of the most recent data developed at the outputs Q1 . . . Q12 of the counter 13 as modified by the offset desired. The shift register circuits 108, 110, 112 will develop respective series of outputs Q1 . . . Q4 which are representative of data previously developed at the outputs Q1 . . . Q12 of the counter 13.

The outputs S1 . . . S4 of adder circuits 102, 104, 106, as well as the outputs Q1 . . . Q4 of shift register circuits 108, 110, 112 are in turn applied to the twelve bit magnitude comparator 19. The comparator 19 comprises three cooperating four bit comparator circuits 120, 122, 124 (e.g., Motorola 4063), the inputs A0 . . . A3 of which are respectively coupled to the outputs S1 . . . S4 of the adder circuits 102, 104, 106, and the inputs B0 . . . B3 of which are respectively coupled to the outputs Q1 . . . Q4 of the shift register circuits 108, 110, 112. The comparator circuits 120, 122, 124 in turn combine to develop an output at 125 which is representative of a successful comparison between a presently sensed and digitized current level developed at the output of the counter 13 and a previously sensed and digitized current level stored in the shift register 17, that being when such parameters differ by no more than the offset introduced at the inputs B1 . . . B4 of adder circuits 102, 104, 106.

Figure 5:
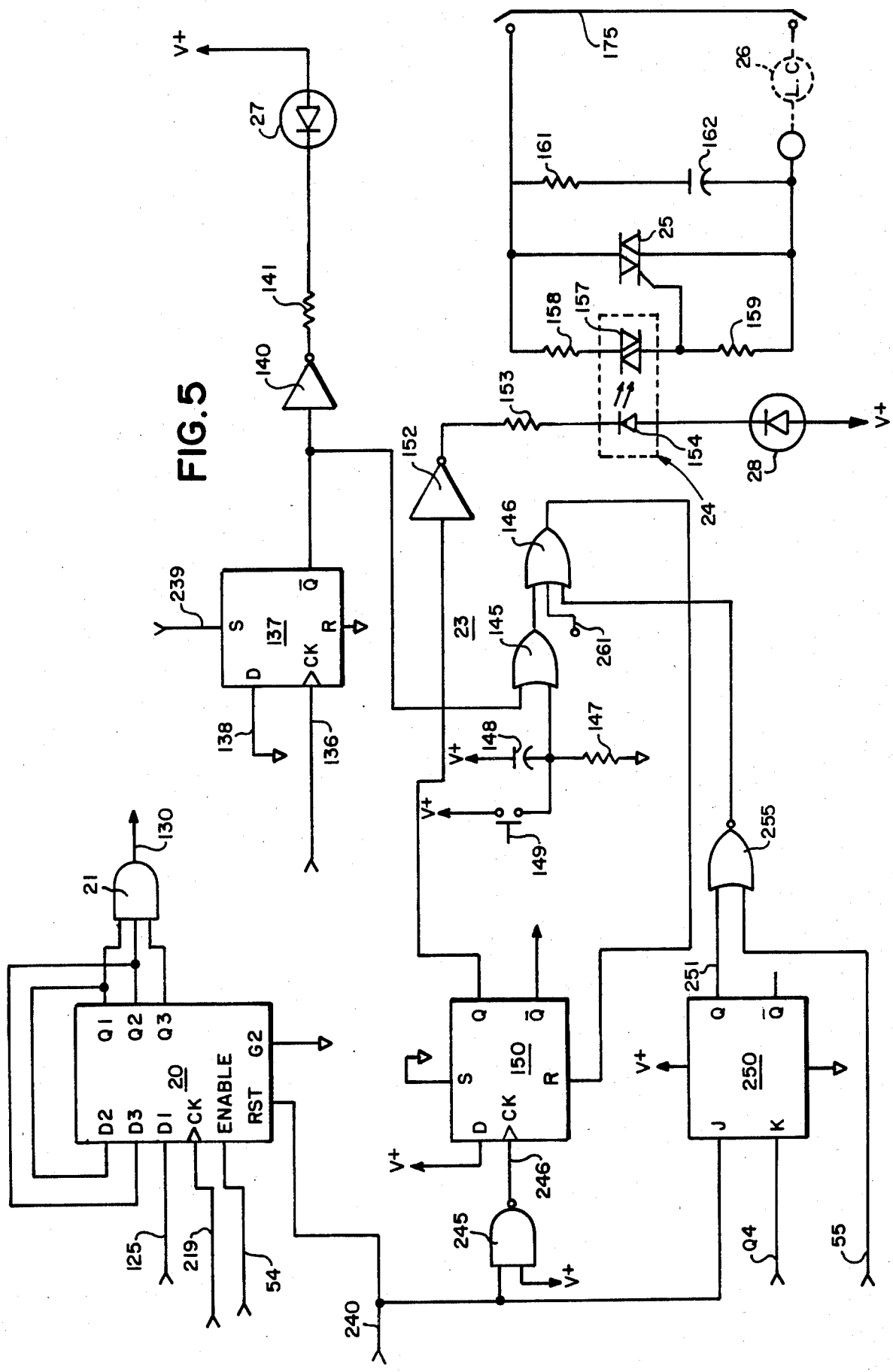
FIG. 5 is a schematic diagram of circuitry used to control battery charger operation in response to the compared parameters produced by the circuitry illustrated in FIG. 4.

With reference to FIG. 5, the output 125 of the magnitude comparator 19 is in turn coupled to the input D1 of a three stage shift register 20. The outputs Q1, Q2 of the shift register 20 are further respectively coupled to the inputs D2, D3 of the shift register 20. The outputs Q1, Q2, Q3 of the shift register 20 are also respectively coupled to each of the three inputs of AND circuit 21. Accordingly, it is required that three successful comparisons be introduced into the shift register 20 at input D1 before a transition is produced at the output 130 of AND circuit 21, whereupon the output 130 of AND circuit 21 will go from low to high. This transition will accordingly indicate that the rate of change in current being delivered to the battery 2 by the battery charger has descreased below a specified value, signifying a desired end to the finishing portions of charging, and accordingly indicating shut-down of the battery charger.

Further coupled to the shift register 20, at the ENABLE input, is the data line 54 shown in FIG. 3. As previously indicated, a transition from high to low will occur at the date line 54 when the finishing stages of battery charging are to be initiated. Accordingly, operation of the shift register 20 will only be enabled after entry into the finishing portions of battery charging. Prior to this, the shift register 20 will be disabled, maintaining the output 130 of AND circuit 21 low.

The output 130 of AND circuit 21 is coupled to an input D4 of a hex D-type flip-flop 135 (e.g., RCA 40174—shown in FIG. 6), for purposes which will be discussed below, the corresponding output Q4 of which is in turn coupled to the input 136 of charger on-off logic circuit 23. Input 136 enters the clock (CK) input of a D-type flip-flop 137, the D input 138 of which is coupled to ground. The $\overline{Q}$ output of the flip-flop 137 will accordingly go high in response to a transition developed at the output 130 of AND circuit 21 as previously described, indicating that the battery has been fully charged. The $\overline{Q}$ output of flip-flop 137 is coupled to the input of an inverter 140, the output of which is coupled to the charging circuit's supply voltage by means of a series combination comprising resistor 141 and light emitting diode 27. It will therefore be understood that when the $\overline{Q}$ output of flip-flop 137 goes from low to high, the output of the inverter 140 will go low, causing operation of the light emitting diode 27. Operation of the light emitting diode 27 will accordingly indicate that the battery 2 has been fully charged.

The $\overline{Q}$ output of flip-flop 137 is also coupled to a first input of OR circuit 145. The second input of OR circuit 145 is associated with a resistor 147 and capacitor 148 connecting the charging circuit's supply voltage to ground, and a pushbutton switch 149 coupled to the charging circuit's supply voltage. It will therefore be understood that either a positive transition of the $\overline{Q}$ output of flip-flop 137, or depression of the switch 149, will cause the output of OR circuit 145 to go high. Accordingly, the switch 149 serves as a means for manually terminating battery charging, if desired.

The output of OR circuit 145 is coupled to a first input of OR circuit 146, the output of which is in turn coupled to the Reset (R) input of a D-type flip-flop 150. Operation of the flip-flop 150 will be described in further detail below, however, it will be understood that the transition previously described in connection with the output of OR circuit 145 will cause a similar transition to occur at the output of OR circuit 146, in turn causing the Reset (R) input of the flip-flop 150 to go high when operation of the battery charging circuit 1 is to be discontinued. This will in turn reset the flip-flop 150, causing its Q output to go low.

The Q output of flip-flop 150 is coupled to an inverter 152, the output of which is coupled to the charging circuit's supply voltage by means of a series combination comprising a resistor 153, the input stage 154 of optocoupler 24, and light emitting diode 28. Accordingly, during battery charging, the output of the inverter 152 will be driven low by the Q output of flip-flop 150, in turn causing a current to flow through the light emitting diode 28 and the input stage 154 of the optocoupler 24. This will cause illumination of the light emitting diode 28, providing a visual indication that the battery charger is on, until such time as battery charging is to be discontinued. In such case, the Q output of flip-flop 150 will drive the output of inverter 152 high, preventing the flow of current through the light emitting diode 28 and the input stage 154 of the optocoupler 24, deactivating the light emitting diode 28 and signaling that the battery charger has been switched off.

The output stage 157 of the optocoupler 24 is placed in series combination with resistors 158, 159, which series combination is further placed in parallel with triac 25 and a resistor 161 and capacitor 162 in series combination. Variations in current flowing through the output stage 157 of the optocoupler 24 will accordingly vary the condition of the triac 25. Since the condition of the Q output of flip-flop 150 will cause operation of the input stage 154 of the optocoupler 24 similarly as the light emitting diode 28, selective operation of the triac 25 will be achieved in accordance with the previously described operational scheme. This will cause activation of the line contactor 26 when charging is to proceed, and deactivation of the line contactor 26 when charging has been completed.

Figure 6:
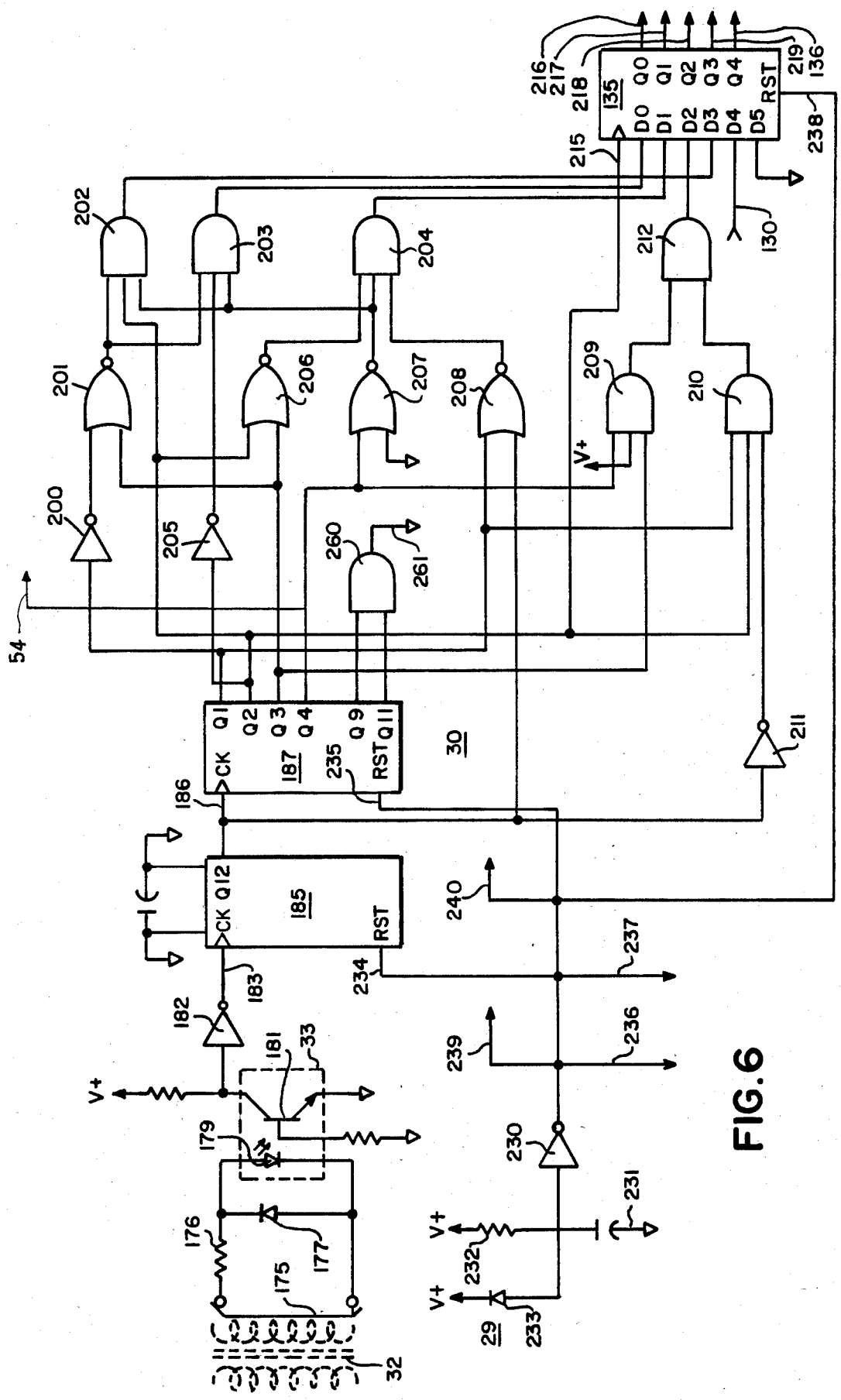
FIG. 6 is a schematic diagram of circuitry used to generate timing and control signals for use in operating the circuitry illustrated in FIGS. 3-5.

FIG. 6 illustrates circuitry capable of providing timing signals to the foregoing circuitry to regulate its operation in accordance with a selected timing scheme as will be more fully described below. Line current, nominally at 60 Hz, provides a basis for the various timing signals developed and is derived from the battery charger's control transformer 32, at 175. Current limiting resistor 176 and diode 177 combine with the input stage 180 of optocoupler 33 to develop a rectified signal which is capable of producing a series of pulses at the output stage 181 of the optocoupler 33. The output stage 181 of optocoupler 33 is coupled to the input of Schmitt trigger inverter 182, the output of which is in turn coupled to the clock (CK) input 183 of a ripple counter 185 (e.g., RCA 4040). The output of ripple counter 185 is in turn coupled to the clock (CK) input 186 of a second ripple counter 187 (e.g., RCA 4040). Various outputs of the ripple counters 185, 187 are used to develop the sequenced timing signals illustrated in FIG. 7, which are used in connection with the circuitry previously described to achieve correct operation of the battery charger termination circuit 1 as will be more fully described below.

Turning first to overall timing considerations, in connection with storage batteries of the type which are generally to be charged using the battery charger termination circuit 1 of the present invention, it has been found that the battery's charging rate need only be monitored periodically, for example once every 20 minutes or so, to achieve safe and efficient charging. While more frequent monitoring rates may be used if desired, it has generally been found to be unnecessary in connection with most battery charging applications. In any event, the ripple counters 185, 187 combine to convert the 60 Hz signal introduced at clock (CK) input 183 to a series of timing pulses which are commensurate with such findings as follows.

Figure 7:
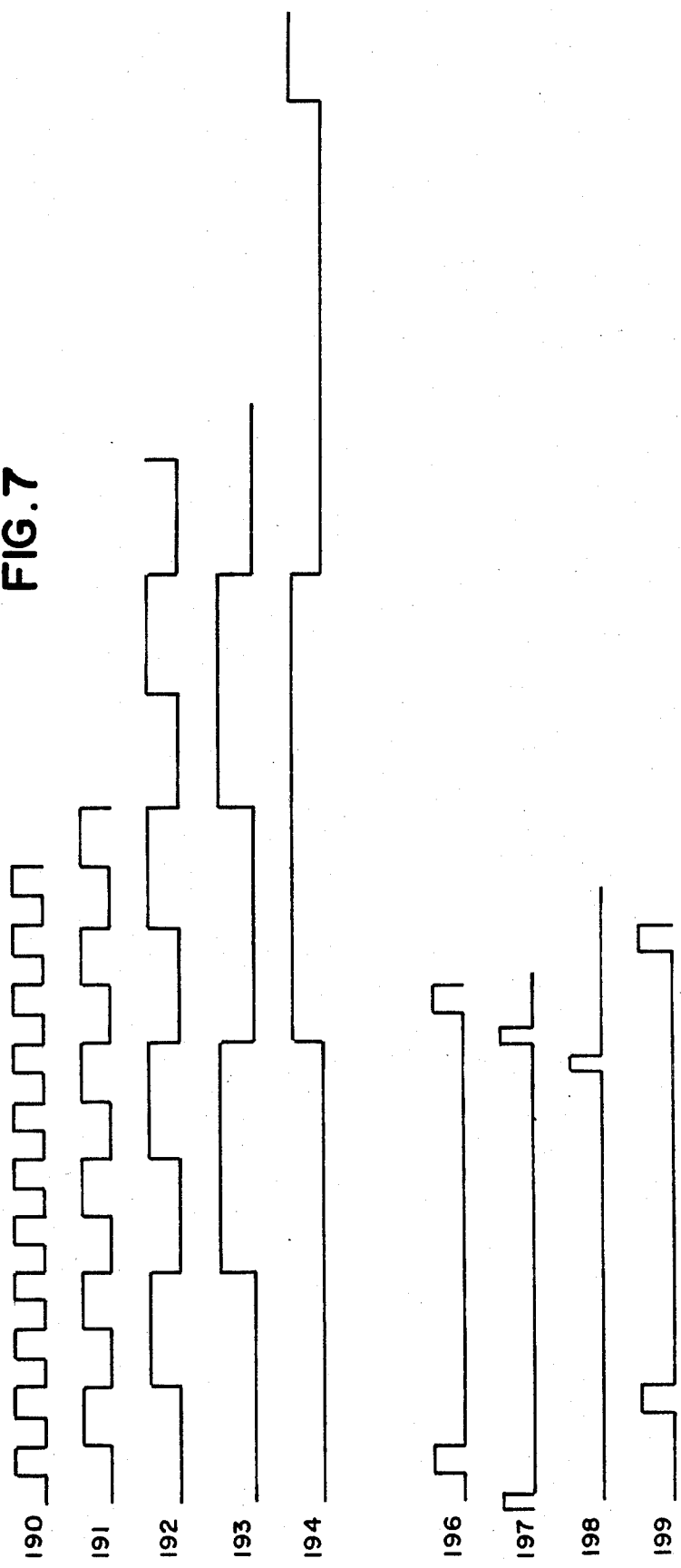
FIG. 7 is a timing diagram illustrating the various timing signals developed by the circuitry illustrated in FIG. 6.

The ripple counter 185 selected for use in connection with the present invention is capable of dividing down the signal introduced at clock (CK) input 183 by a total factor of 4,096, at output Q12. Accordingly, by coupling output Q12 of ripple counter 185 to the clock (CK) input 186 of ripple counter 187, a clocking pulse will be provided to ripple counter 187 on the order of once every 34.1 seconds. The clocking pulse introduced at the input 186 is shown in FIG. 7 at 190. Further subdivision of this signal is developed at outputs Q1, Q2, Q3, Q4 of ripple counter 187, respectively identified in FIG. 7 at 191, 192, 193, 194. Output Q4 will thus occur on the order of once every 18.2 minutes, approximating the desired sampling rate of once every 20 minutes. Of course, this sampling rate is easily increased by coupling the clock (CK) input 186 of ripple counter 187 to other outputs Q1 ... Q11 of ripple counter 185, as desired. Signals 190, 191, 192, 193, 194 are subsequently processed as follows.

The output Q1 of ripple counter 187 is coupled to an inverter 200, the output of which is in turn coupled to a first input of a NOR circuit 201. The second input of NOR circuit 201 is coupled to the output Q3 of ripple counter 187.

The output of NOR circuit 201 is coupled to the first input of a three input AND circuit 202. A second input of AND circuit 202 is coupled to output Q2 of ripple counter 187. The third input of AND circuit 202 is coupled to AND circuits 203, 204 as will be more fully described below.

The output of NOR circuit 201 is also coupled to a first input of AND circuit 203. The second input of AND circuit 203 is coupled to output Q2 of ripple counter 187 by means of an inverter 205.

Outputs Q2, Q3 of ripple counter 187 are respectively coupled to the inputs of a NOR circuit 206, the output of which is coupled to a first input of AND circuit 204. A second input of AND circuit 204 is coupled to third inputs of AND circuits 202, 203, and to the output Q4 of ripple counter 187 by means of a two input NOR circuit 207 having a second input which is coupled to ground. The third input of AND circuit 204 is coupled to the output of a two input NOR circuit 208, one input of which is coupled to the output Q1 of ripple counter 187, and the other input of which is coupled to the output Q12 of ripple counter 185.

The outputs Q3, Q4 of the ripple counter 187 are further respectively coupled to two of three inputs of AND circuit 209. The third input of AND circuit 209 is coupled to the charging circuit's supply voltage. Outputs Q1 and Q2 of ripple counter 187 are also respectively coupled to two of three inputs of an AND circuit 210. The third input of AND circuits 210 is coupled to the output Q12 of ripple counter 185 by means of an inverter 211. The outputs of AND circuits 209, 210 are respectively coupled to a two input AND circuit 212.

The outputs of AND circuits 202, 203, 204, 212 are separately coupled to four inputs D0, D1, D2, D3 of the hex D-type flip-flop 135. The shaped waveforms developed at the inputs D0, D1, D2, D3 are illustrated in FIG. 7, the output of AND circuit 202 being illustrated at 199; the output of AND circuit 203 being illustrated at 196; the output of AND circuit 204 being illustrated at 197; and the output of AND circuit 212 being illustrated at 198.

It will be noted that the clock input 215 of hex D-type flip-flop 135 is coupled to output Q2 of ripple counter 187. It will therefore be understood that the inputs D0, D1, D2, D3, D4 will be respectively clocked through to the outputs Q0, Q1, Q2, Q3, Q4 in response to the output Q2 of ripple counter 187. This provides a clocked delay which has been found useful in preventing transients and other forms of errors, particularly in view of the relatively long time periods which are to be developed at the outputs Q0, Q1, Q2, Q3, Q4 of the hex D-type flip-flop 135.

The outputs Q0, Q1, Q2, Q3, Q4 of hex D-type flip-flop 135 interface with the remainder of the battery charger termination circuit 1 as follows. Output Q0 is coupled to a second input of AND circuit 98 (FIG. 4) via connection 216. Output Q1 is coupled to a first input of an OR circuit 225 (FIG. 4) via connection 217, for purposes which will be more fully described below. Output Q2 is coupled to the clock (CK) inputs of shift register circuits 108, 110, 112 (FIG. 4) via connection 218. Lastly, output Q3 is coupled to the clock (CK) input of shift register 20 (FIG. 5) via connection 219. The outputs Q0, Q1, Q2, Q3 of hex D-type flip-flop 135 will accordingly provide timing signals capable of suitably gating the various inputs to the counter 13, the shift register 17, and the shift register 20 as will be more fully described below.

Additionally provided in connection with the battery charger termination circuit 1 are control signals which accommodate initial start-up of the battery charger. With reference to FIG. 6, start-up of the battery charger is sensed by means of the timing delay circuit 29. The timing delay circuit 29 generally comprises a Schmitt trigger inverter 230, the input of which is coupled to ground via capacitor 231, and to the charging circuit's supply voltage by resistor 232 and diode 233. Upon the initation of charger operation, capacitor 231 will cooperate with resistor 232 to cause the output of inverter 230 to initially go high, for a specified period of time, and to thereafter go low. In practice, use of a 5–10 second period is preferred in connection with most battery charging applications. The output of inverter 230 is coupled to various components including respective reset (RST) inputs 234, 235 of ripple counters 185, 187; the reset (RST) inputs 236 of the shift register circuits 108, 110, 112; the second input of OR circuit 225, via line 237; the reset (RST) input 238 of the hex D-type flip-flop 135; the set (S) input of the flip-flop 137, via line 239; and the reset (RST) input of the shift register 20, via line 240. Accordingly, when the battery charger is switched on a transition will occur at the output of inverter 230 (from low to high to low) which will reset a variety of components of the battery charger termination circuit 1 including the counter 13, the ripple counters 185, 187, the shift register circuits 108, 110, 112, and the shift register 20.

The transition produced at the output of inverter 230 if further used to regulate operation of the circuitry illustrated in FIG. 5 as follows.

First, the output of inverter 230 is applied to a first input of NAND circuit 245. The second input of NAND circuit 245 is coupled to the charging circuit's supply voltage, and its output is coupled to the clock (CK) input 246 of the flip-flop 150 which is used to operate the battery charger. It will be understood that after an initial 5–10 second operating period, the output of AND circuit 245 will go high, toggling the flip-flop 150 and initiating operation of the battery charger by means of the optocoupler 24 as previously described.

The output of inverter 230 is also applied to the J input of J-K type flip-flop 250, the K input of which is coupled to output Q4 of ripple counter 187. It will therefore be understood that upon switching the charger on, the J input of flip-flop 250 will be driven high, in turn driving the output Q of flip-flip 250 low. This condition will be maintained until such time as ripple counter 187 generates an output at Q4, which will then drive the output Q of flip-flop 250 high after a specified period of time, in this case on the order of 18.2 seconds. The Q output of flip-flop 250 is coupled to a first input of a two input NOR circuit 255, the second input of which is coupled to data line 55 shown in FIG. 3. As previously described, data line 55 remains low until such time as the battery 2 achieves a specified voltage level, at which time data line 55 goes high. Accordingly, the output of NOR circuit 255 will be low unless the battery 2 achieves the selected charging capacity within the first 18.2 minutes of charger operation, which is taken to signify that the battery has already been fully charged, and should not be subjected to further charging. To this end, the output of NOR circuit 255 is coupled to a second input of OR circuit 146 so that the output of NOR circuit 255 can cause the flip-flop 150 to shut down the battery charger in such case, as previously described.

Lastly, charger shut-down is further controlled by means of an AND circuit 260 having inputs coupled to outputs Q9, Q11 of the ripple counter 187. The output of AND circuit 260 is coupled to the input of OR circuit 146, at 261. In connection with the timing scheme previously discussed in connection with ripple counter 187, the output of AND circuit 260 will go high after approximately twelve hours of charger operation. Such an event is taken as an indication that the battery 2 contains a fault which is preventing its charging, and the output of AND circuit 260 accordingly provides a signal, via OR circuit 146, to shut down the battery charger as previously described.

In operation, upon switching the battery charger on, two events occur. First, the time delay circuit 29 operates to initially reset various components of the charging circuit 1. Second, the voltage level detection circuit 8 operates to disable the battery charger termination circuit 1 during initial charging portions of the battery charging process. As previously indicated, if the voltage level detection circuit 8 senses that the battery has reached its selected voltage level before the time delay circuit 29 signals passage of an initial time period, the flip-flop 250 will cause shut-down of the battery charger, assuming the battery to be fully charged. Otherwise, initial portions of the battery charging process will continue until the voltage level detection circuit 8 indicates that the battery has reached a proper voltage level and is therefore ready to enter finishing portions of the battery charging process. At this time, operation of the shift register 20 is enabled.

Thereafter, the timing and control circuit 30 will produce timing pulses in accordance with FIG. 7, and the scaling amplifier 10 and voltage controlled oscillator 11 will commence the development of signals representative of current delivered to the battery during the finishing portions of the charging process. The voltage controlled oscillator 11 will generate a digital output proportional to the current being supplied to the battery 2, which signal will be loaded into the counter 13 in accordance with the timing pulse 196 shown in FIG. 7. After a digital signal representative of current has been developed by the counter 13, the shift register circuits 108, 110, 112 will enter this information in accordance with the timing pulse 198 shown in FIG. 7. This entered data will then be compared with subsequent data, modified by the offset produced via data buss 16, in the comparator 19. Unsuccessful comparisons are simply cleared via OR circuit 225 in accordance with the timing pulse 197 shown in FIG. 7.

This procedure will continue until such time as a successful comparison is made, indicating that the two parameters measured differ by no more than the selected offset. The successful comparison will then be clocked into the shift register 20 in accordance with the timing pulse 199 shown in FIG. 7. When the shift register 20 has clocked in three such indications, signifying termination of the charging process, the battery charger is shut down as previously described. Should the battery charger continue to operate for up to twelve hours, indicating a potential fault in the battery, the battery charger will again be shut down.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. In a method for charging a storage battery wherein the battery is initially charged at a maximum rate of current which tapers in magnitude until the battery attains a preselected voltage, and is thereafter charged at reduced rate of current which tapers in magnitude during finishing portions of said charging, the improvement wherein the method further comprises the steps of:
   (a) monitoring the current delivered to the battery during said charging, thereby developing data defining a curve representative of current delivered to the battery over time;
   (b) monitoring the slope of said curve during charging; and
   (c) terminating the charging process when a preselected slope value in a range between approximately $-2.0$ and $-0.5$ amperes per 100 ampere hours per hour is attained.

2. The method of claim 1 wherein said selected value lies in a range between approximately $-1.5$ and $-1.0$ amperes per 100 ampere hours per hour.

3. The method of claim 1 wherein the monitoring of step (b) only occurs during the finishing portions of said charging.

4. The method of claim 3 wherein said monitoring determines when said rate of change decreases below a selected value.

5. The method of claim 4 wherein said monitoring is performed digitally.

6. The method of claim 1 wherein the monitoring of step (a) includes sensing the current delivered to the battery, and developing a digital signal which is proportional to said sensed current.

7. The method of claim 6 wherein the monitoring of step (b) includes storing said digital signal in memory means for comparison with subsequent digital signals developed.

8. The method of claim 7 wherein the terminating of step (c) includes comparing the stored digital signal with the subsequent digital signal, and terminating the charging when said digital signals differ by no more than a selected value.

9. In an apparatus for charging a storage battery wherein the battery is initially charged at a maximum rate of current which tapers in magnitude until the battery attains a pre-selected voltage, and is thereafter charged at a reduced rate of current which tapers in magnitude during finishing portions of said charging, the improvement which further comprises:
   (a) means for monitoring the current delivered to the battery during said charging, thereby developing data defining a curve representative of current delivered to the battery over time, said current monitoring means comprising:
      (i) shunt means placed in series electrical connection with said battery, to develop an analog signal indicative of current delivered to the battery; and
      (ii) means coupled to said shunt means for converting said analog signal to a digital signal;
   (b) means for monitoring the slope of said curve during charging, said slope monitoring means comprising:
      (i) counter means coupled to said current monitoring means, for producing a digital representation proportional to the output of said current monitoring means;
      (ii) shift register means coupled to said counter means and adapted to store data representative of the current being delivered to said battery;
      (iii) outer means coupled to said counter means and adapted to develop data representative of the current being delivered to said battery and an offset representative of a selected slope value; and
      (iv) comparison means coupled to said shift register means and said outer means, for comparing data stored in said shift register means with offset data developed in said outer means; and
   (c) means for terminating said charging in accordance with the slope of said curve.

10. The apparatus of claim 9 wherein said terminating means includes means for terminating said charging when the slope of said curve attains a selected value.

11. The apparatus of claim 9 wherein said apparatus further comprises voltage level detection means, and wherein said terminating means is only operative when said voltage level detection means detects a battery voltage which has attained a selected value.

12. The apparatus of claim 9 wherein said converting means is a voltage controlled oscillator in series combination with an amplifier.

13. The apparatus of claim 9 wherein said comparison means develops a termination signal adapted to terminate said charging when the data stored in said shift register means approximately equals the offset data developed in said adder means.

14. The apparatus of claim 13 further comprising charging operation control means coupled to said comparison means and capable of terminating charging upon receiving said termination signal.

15. The apparatus of claim 13 wherein said termination signal is developed after a selected number of successful data comparisons are made.

16. The apparatus of claim 9 further comprising means for terminating said charging if the battery attains said preselected voltage before a specified time period has lapsed.

17. The apparatus of claim 9 further comprising means for terminating said charging if the battery fails to attain said preselected voltage after a specified time period has passed.

* * * * *

UNITED STATES PATENT OFFICE
CERTIFICATE OF CORRECTION

Patent No. 4,629,965            Dated December 16, 1986

Inventor(s) William H. Fallon et al

It is certified that error appears in the above-identified patent and that said Letters Patent are hereby corrected as shown below:

Column 3, line 67, "operating" should read --operation--.

Column 5, line 26, "voltaqge" should read --voltage--.

Column 14, line 19, "outer" should read --adder--.

Column 14, line 25, "outer" should read --adder--.

Column 14, line 27, "outer" should read --adder--.

Signed and Sealed this

Twenty-eighth Day of April, 1987

Attest:

DONALD J. QUIGG

Attesting Officer      Commissioner of Patents and Trademarks